US012198601B2

(12) United States Patent
Liu et al.

(10) Patent No.: US 12,198,601 B2
(45) Date of Patent: Jan. 14, 2025

(54) DISPLAY SUBSTRATE AND DISPLAY DEVICE

(71) Applicants: HEFEI BOE DISPLAY TECHNOLOGY CO., LTD., Anhui (CN); BOE TECHNOLOGY GROUP CO., LTD., Beijing (CN)

(72) Inventors: Qi Liu, Beijing (CN); Chunxu Zhang, Beijing (CN); Jiantao Liu, Beijing (CN); Lei Guo, Beijing (CN); Maoxiu Zhou, Beijing (CN); Min Cheng, Beijing (CN); Xiaoting Jiang, Beijing (CN)

(73) Assignees: HEFEI BOE DISPLAY TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/027,111

(22) PCT Filed: Mar. 21, 2022

(86) PCT No.: PCT/CN2022/081962

§ 371 (c)(1),
(2) Date: Mar. 19, 2023

(87) PCT Pub. No.: WO2023/178469

PCT Pub. Date: Sep. 28, 2023

(65) Prior Publication Data

US 2024/0321168 A1 Sep. 26, 2024

(51) Int. Cl.
*G09G 3/20* (2006.01)

(52) U.S. Cl.
CPC ... *G09G 3/2092* (2013.01); *G09G 2320/0233* (2013.01)

(58) Field of Classification Search
CPC ......... G09G 3/2092; G09G 2320/0233; G09G 2310/0286
See application file for complete search history.

(56) References Cited

U.S. PATENT DOCUMENTS

2010/0245335 A1 9/2010 Kimura et al.
2019/0213970 A1 7/2019 Wang et al.
2019/0214104 A1* 7/2019 Qian ..................... G11C 19/28
(Continued)

FOREIGN PATENT DOCUMENTS

CN 104200788 A 12/2014
CN 110517619 A 11/2019
(Continued)

*Primary Examiner* — Rodney Amadiz
(74) *Attorney, Agent, or Firm* — WHDA, LLP

(57) ABSTRACT

The present disclosure provides a display substrate and a display device. The display substrate includes a base substrate and a driving circuit arranged on the base substrate. The driving circuit includes multiple denoising transistors and multiple transistors for driving, and the denoising transistors are electrically connected to a pull-up node. A length of a channel of each of at least a part of the denoising transistors is a first length L1, a length of a channel of each of at least a part of the multiple transistors for driving is a second length L2, and the first length L1 is not equal to the second length L2.

20 Claims, 11 Drawing Sheets

(56) References Cited

U.S. PATENT DOCUMENTS

| | | | | |
|---|---|---|---|---|
| 2019/0392916 | A1* | 12/2019 | Gu | G09G 3/20 |
| 2020/0135287 | A1 | 4/2020 | Han | |
| 2021/0366350 | A1* | 11/2021 | Xue | G09G 3/2092 |
| 2022/0208070 | A1 | 6/2022 | Dong et al. | |
| 2022/0301510 | A1 | 9/2022 | Ma et al. | |
| 2022/0327975 | A1 | 10/2022 | Yan et al. | |

FOREIGN PATENT DOCUMENTS

| | | | |
|---|---|---|---|
| CN | 111179803 | A | 5/2020 |
| CN | 210865579 | U | 6/2020 |
| CN | 109166600 | B | 1/2021 |
| CN | 107945765 | B | 3/2021 |
| CN | 112634974 | A | 4/2021 |
| CN | 113053447 | A | 6/2021 |

* cited by examiner

DISPLAY SUBSTRATE AND DISPLAY DEVICE

CROSS-REFERENCE TO RELATED APPLICATION

This application is the U.S. national phase of PCT Application No. PCT/CN2022/081962 filed on Mar. 21, 2022, which is incorporated by reference herein in its entirety.

TECHNICAL FIELD

The present disclosure relates to the field of display technology, in particular to a display substrate and a display device.

BACKGROUND

In the related art, the charging time for each row of pixels in a large-sized display product with a high refresh rate becomes short, and a low-temperature start-up difficulty is easily caused during a low-temperature reliability test. Therefore, in a driving circuit, a gate electrode and a source electrode of a transistor for driving a pull-up node are separated, so as to address the above-mentioned issue. Due to the layout space issue, a transistor for resetting a driving signal is not provided in the driving circuit, rather, a driving signal output end is discharged only through a transistor for driving the driving signal output end, when a potential at the pull-up node (a gate electrode of the transistor for driving the driving signal output end is electrically connected to the pull-up node) is unstable, the discharge at the driving signal output end is adversely affected. In the lighting process of the large-sized display product with a high refresh rate, mischarging occurs due to a slow pull-down of the potential of the driving signal, and then a horizontal Mura defect occurs.

SUMMARY

In one aspect, the present disclosure provides in some embodiments a display substrate including a base substrate and a driving circuit arranged on the base substrate. The driving circuit includes multiple denoising transistors and multiple transistors for driving, and the denoising transistors are electrically connected to a pull-up node. A length of a channel of each of at least a part of the denoising transistors is a first length L1, a length of a channel of each of at least a part of the multiple transistors for driving is a second length L2, and the first length L1 is not equal to the second length L2.

In a possible embodiment of the present disclosure, the first length L1 is greater than the second length L2.

In a possible embodiment of the present disclosure, the first length L1 is greater than or equal to 5.5 μm and smaller than or equal to 9 μm, the second length L2 is greater than or equal to 2 μm and smaller than or equal to 5.0 μm, and a ratio of the first length L1 to the second length L2 is greater than or equal to 1.1 and smaller than or equal to 4.5.

In a possible embodiment of the present disclosure, the driving circuit further comprises a transistor for denoising a carry signal output end, and a transistor for denoising a driving signal output end. A length of a channel of the transistor for denoising the carry signal output end is a third length L3, a length of a channel of the transistor for denoising the driving signal output end is a fourth length L4, and the third length L3 is not equal to the second length L2, and the fourth length L4 is not equal to the second length L2.

In a possible embodiment of the present disclosure, the third length L3 is greater than the second length L2, and the fourth length is greater than the second length L2.

In a possible embodiment of the present disclosure, the third length L3 is greater than or equal to 5.5 μm and smaller than or equal to 9 μm, the fourth length L4 is greater than or equal to 5.5 μm and smaller than or equal to 9 μm, the second length L2 is greater than or equal to 2 μm and smaller than or equal to 5.0 μm, a ratio of the third length L3 to the second length L2 is greater than or equal to 1.1 and smaller than or equal to 4.5, and a ratio of the fourth length L4 to the second length L2 is greater than or equal to 1.1 and smaller than or equal to 4.5.

In a possible embodiment of the present disclosure, the transistor for driving includes a transistor for driving the pull-up node, a transistor for driving a carry signal output end, and a transistor for driving a driving signal output end.

In a possible embodiment of the present disclosure, the driving circuit includes a first transistor, a second transistor, a third transistor, a fourth transistor, a fifth transistor and a sixth transistor, and the first transistor, the second transistor, the third transistor, and the fourth transistor are the denoising transistors. A control electrode of the first transistor is electrically connected to a pull-up resetting end, a first electrode of the first transistor is electrically connected to the pull-up node, and a second electrode of the first transistor is electrically connected to a first voltage end. A control electrode of the second transistor is electrically connected to a first pull-down node, a first electrode of the second transistor is electrically connected to the pull-up node, and a second electrode of the second transistor is electrically connected to the first voltage end. A control electrode of the third transistor is electrically connected to a second pull-down node, a first electrode of the third transistor is electrically connected to the pull-up node, and a second electrode of the third transistor is electrically connected to the first voltage end. A control electrode of the fourth transistor is electrically connected to an ON voltage end, a first electrode of the fourth transistor is electrically connected to the pull-up node, and a second electrode of the fourth transistor is electrically connected to the first voltage end.

In a possible embodiment of the present disclosure, the driving circuit includes a fifth transistor and a sixth transistor, and the fifth transistor and the sixth transistor are the denoising transistors. A control electrode of the fifth transistor is electrically connected to the pull-up node, a first electrode of the fifth transistor is electrically connected to a first pull-down control node, and a second electrode of the fifth transistor is electrically connected to the first voltage end. A control electrode of the sixth transistor is electrically connected to the pull-up node, a first electrode of the sixth transistor is electrically connected to a second pull-down control node, and a second electrode of the sixth transistor is electrically connected to the first voltage end.

In a possible embodiment of the present disclosure, at least one of a length of a channel of the first transistor, a length of a channel of the second transistor, a length of a channel of the third transistor, a length of a channel of the fourth transistor, a length of a channel of the fifth transistor, and a length of a channel of the sixth transistor is the first length L1.

In a possible embodiment of the present disclosure, the driving circuit further includes a seventh transistor, an eighth transistor and a ninth transistor, and the seventh transistor, the eighth transistor and the ninth transistor are driving transistors for driving. A control electrode of the seventh transistor is electrically connected to the pull-up node, a first electrode of the seventh transistor is electrically connected to a clock signal end, and a second electrode of the seventh transistor is electrically connected to the driving signal output end. A control electrode of the eighth transistor is electrically connected to the pull-up node, a first electrode of the eighth transistor is electrically connected to the clock signal end, and a second electrode of the eighth transistor is electrically connected to a carry signal output end. A control electrode of the ninth transistor is electrically connected to a first input end, a first electrode of the ninth transistor is electrically connected to a second input end, and a second electrode of the ninth transistor is electrically connected to the pull-up node.

In a possible embodiment of the present disclosure, at least one of a length of a channel of the seventh transistor, a length of a channel of the eighth transistor, and a length of a channel of the ninth transistor is the second length L2.

In a possible embodiment of the present disclosure, the driving circuit further includes a tenth transistor, an eleventh transistor, a twelfth transistor and a thirteenth transistor. A control electrode of the tenth transistor is electrically connected to the first pull-down node, a first electrode of the tenth transistor is electrically connected to a driving signal output end, and a second electrode of the tenth transistor is electrically connected to a second voltage end. A control electrode of the eleventh transistor is electrically connected to the second pull-down node, a first electrode of the eleventh transistor is electrically connected to the driving signal output end, and a second electrode of the eleventh transistor is electrically connected to the second voltage end. A control electrode of the twelfth transistor is electrically connected to the first pull-down node, a first electrode of the twelfth transistor is electrically connected to the carry signal output end, and a second electrode of the twelfth transistor is electrically connected to the first voltage end. A control electrode of the thirteenth transistor is electrically connected to the second pull-down node, a first electrode of the thirteenth transistor is electrically connected to the carry signal output end, and a second electrode of the thirteenth transistor is electrically connected to the first voltage end. The tenth transistor and the eleventh transistor are transistors for denoising the driving signal output end, and the twelfth transistor and the thirteenth transistor are transistors for denoising the carry signal output end. A length of a channel of the tenth transistor and a length of a channel of the eleventh transistor are each a third length L3, and a length of a channel of the twelfth transistor and a length of a channel of the thirteenth transistor are each a fourth length L4.

In a possible embodiment of the present disclosure, the driving circuit further includes a fourteenth transistor, a fifteenth transistor, a sixteenth transistor, a seventeenth transistor, an eighteenth transistor, a nineteenth transistor, a twentieth transistor, a twenty-first transistor and a capacitor. A control electrode of the fourteenth transistor and a first electrode of the fourteenth transistor are electrically connected to a first control voltage end, and a second electrode of the fourteenth transistor is electrically connected to a first pull-down control node. A control electrode of the fifteenth transistor and a first electrode of the fifteenth transistor are electrically connected to a second control voltage end, and a second electrode of the fifteenth transistor is electrically connected to a second pull-down control node. A control electrode of the sixteenth transistor is electrically connected to the pull-up node, a first electrode of the sixteenth transistor is electrically connected to the first pull-down node, and a second electrode of the sixteen transistor is electrically connected to the first voltage end. A control electrode of the seventeenth transistor is electrically connected to the pull-up node, a first electrode of the seventeenth transistor is electrically connected to the second pull-down node, and a second electrode of the seventeenth transistor is electrically connected to the first voltage end. A control electrode of the eighteenth transistor is electrically connected to the first pull-down control node, a first electrode of the eighteenth transistor is electrically connected to the first control voltage end, and a second electrode of the eighteenth transistor is electrically connected to the first pull-down node. A control electrode of the nineteenth transistor is electrically connected to the second pull-down control node, a first electrode of the nineteenth transistor is electrically connected to the second control voltage end, and a second electrode of the nineteenth transistor is electrically connected to the second pull-down node. A control electrode of the twentieth transistor is electrically connected to the first input end, a first electrode of the twentieth transistor is electrically connected to the first pull-down node, and a second electrode of the twentieth transistor is electrically connected to the first voltage end. A control electrode of the twenty-first transistor is electrically connected to the first input end, a first electrode of the twenty-first transistor is electrically connected to the second pull-down node, and a second electrode of the twenty-first transistor is electrically connected to the first voltage end.

In a possible embodiment of the present disclosure, a width-to-length ratio of the first transistor is B1, a width-to-length ratio of the ninth transistor is A1, a width-to-length ratio of the fourth transistor is B2, both a width-to-length ratio of the second transistor and a width-to-length ratio of the third transistor are B3, and a width-to-length ratio of the seventh transistor is A2. Both a width-to-length ratio of the tenth transistor and a width-to-length ratio of the eleventh transistor are B4, and both a width-to-length ratio of the twelfth transistor and a width-to-length ratio of the thirteenth transistor are B5. B1/A1 is greater than or equal to 0.1 and smaller than or equal to 0.8, B2/A1 is greater than or equal to 0.005 and smaller than or equal to 0.5, B3/A1 is greater than or equal to 0.01 and smaller than or equal to 0.5, B4/A1 is greater than or equal to 0.04 and smaller than or equal to 0.4, and B5/A1 is greater than or equal to 0.01 and smaller than or equal to 0.3. B1/A2 is greater than or equal to 0.02 and smaller than or equal to 0.08, B2/A2 is greater than or equal to 0.01 and smaller than or equal to 0.06, B3/A2 is greater than or equal to 0.015 and smaller than or equal to 0.05, B4/A2 is greater than or equal to 0.004 and smaller than or equal to 0.048, and B5/A2 is greater than or equal to 0.001 and smaller than or equal to 0.045.

In a possible embodiment of the present disclosure, a width-to-length ratio of the fifth transistor and a width-to-length ratio of the sixth transistor are C1, a width-to-length ratio of the sixteenth transistor is C2, both a width-to-length ratio of the fourteenth transistor and a width-to-length ratio of the fifteenth transistor are C3, and both a width-to-length ratio of the eighteenth transistor and a width-to-length ratio of the nineteenth transistor are C4. C1/A1 is greater than or equal to 0.03 and smaller than or equal to 0.09, C2/A1 is greater than or equal to 0.08 and smaller than or equal to 0.6, C3/A1 is greater than or equal to 0.005 and smaller than or equal to 0.046, and C4/A1 is greater than or equal to 0.03 and smaller than or equal to 0.09. C1/A2 is greater than or equal to 0.005 and smaller than or equal to 0.02, C2/A2 is greater than or equal to 0.01 and smaller than or equal to 0.06, C3/A2 is greater than or equal to 0.01 and smaller than or equal to 0.05, and C4/A2 is greater than or equal to 0.003 and smaller than or equal to 0.04.

In another aspect, the present disclosure provides in some embodiments a display device including the above-mentioned display substrate.

DETAILED DESCRIPTION

Figure 1:
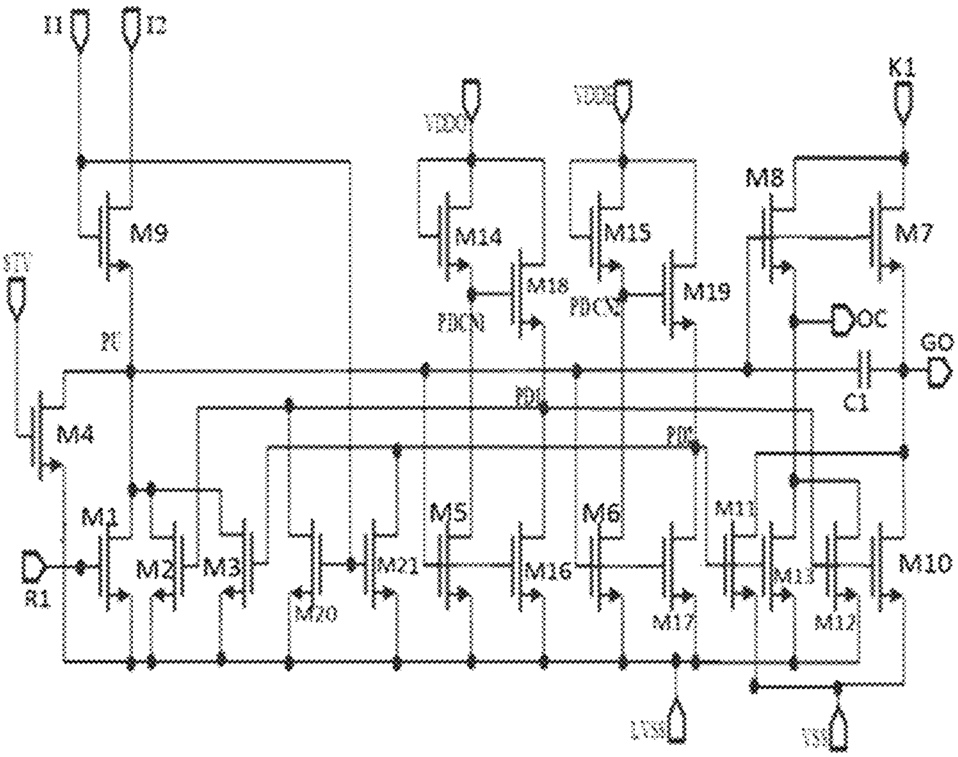
FIG. 1 is a circuit diagram of a driving circuit in a display substrate according to one embodiment of the present disclosure.

The technical solutions in the embodiments of the present disclosure will be described hereinafter clearly and completely with reference to the drawings of the embodiments of the present disclosure. Apparently, the following embodiments relate to a part of, rather than all of, the embodiments of the present disclosure, and based on these embodiments, a person of ordinary skill in the art may, without any creative effort, obtain other embodiments, which also fall within the scope of the present disclosure.

The present disclosure provides in some embodiments a display substrate including a base substrate and a driving circuit arranged on the base substrate. The driving circuit includes multiple denoising transistors and multiple transistors for driving, and the denoising transistors are electrically connected to a pull-up node. A length of a channel of each of at least a part of the denoising transistors is a first length L1, a length of a channel of each of at least a part of the multiple transistors for driving is a second length L2, and the first length L1 is not equal to the second length L2.

In the embodiments of the present disclosure, the length of the channel of each of at least a part of the multiple denoising transistors is not equal to the length of the channel of each of at least a part of the multiple transistors for driving, so as to mitigate the current leakage at the pull-up node, and ensure that a gate electrode of a transistor for driving a driving signal output end is sufficiently turned on, thereby to reduce a falling time Tf of a driving signal from the driving signal output end, and mitigate the occurrence of horizontal Mura.

In at least one embodiment of the present disclosure, the first length L1 is greater than the second length L2.

In at least one embodiment of the present disclosure, the first length L1 is greater than the second length L2, so as to reduce a width-to-length ratio of each of at least a part of the multiple denoising transistors, thereby to provide a smaller leakage current Ioff, and ensure a potential at the pull-up node to be a higher voltage during the operation of the entire driving circuit due to the reduced leakage current of each of at least a part of the multiple denoising transistors. When the driving signal output end finishes outputting a high voltage signal, due to a voltage maintaining characteristic of the pull-up node, it is able to stably maintain the gate electrode of the transistor for driving the driving signal output end as an on state. At this time, when a clock signal received by the first electrode of the transistor for driving the driving signal output end changes to a low level, it is able to achieve a better discharge effect at the driving signal output end without having a great influence on other functions.

In a possible embodiment of the present disclosure, the first length L1 is greater than or equal to 5.5 μm and smaller than or equal to 9 μm. For example, L1 may be 5.5 μm, 6 μm, 6.5 μm, 7 μm, 7.5 μm, 8 μm, 8.5 μm or 9 μm. The second length L2 is greater than or equal to 2 μm and smaller than or equal to 5.0 μm. For example, L2 may be 2 μm, 2.5 μm, 2.8 μm, 3 μm, 3.2 μm, 3.5 μm, 3.8 μm, 4 μm, 4.3 μm, 4.5 μm or 5 μm. The ratio of the first length L1 to the second length L2 is greater than or equal to 1.1 and smaller than or equal to 4.5. For example, the ratio of the first length L1 to the second length L2 may be 1.1, 1.3, 1.627, 1.8, 2, 2.3, 2.5, 2.7, 3, 3.2, 3.5, 3.8, 4, 4.2 or 4.5. However, the present disclosure is not limited thereto.

In the related art, each thin film transistor in the driving circuit is designed to have a same length of channel, so as to ensure that a characteristic curve region of each thin film transistor is consistent for facilitating control. Along with the upgrade of a display product, the high refresh rate poses certain challenges to a charging rate of a large-size display product, while a narrow frame imposes certain restrictions on a size of each thin film transistor in the large-size display product. Due to the layout and production of a high refresh rate display product, it requires to increase a width-to-length ratio of each transistor for driving correspondingly, thereby to ensure the charging rate of the high refresh rate display product.

When a gate-to-source voltage Vgs of a thin film transistor is greater than Vth, and a drain-to-source voltage Vds of the thin film transistor is smaller than Vgs-Vth, $$I_{ds} = \mu \cdot C_{ox} \cdot \frac{W}{L}\left(V_{gs} - V_{th} - \frac{1}{2}V_{ds}\right) \cdot V_{ds},$$

where Ids is a drain-to-source current, μ is an electron mobility, $C_{ox}$ is a capacitance per unit area of a MIS (metal-insulation layer-semiconductor) structure of the thin film transistor, and W/L represents a ratio of a width of a channel of the thin film transistor to a length of the channel.

As can be seen from the above formula, in order to increase an on-state current of the thin film transistor, μ, $C_{ox}$, W/L, Vgs and Vds may be improved, and other parameters apart from Vgs and Vds may be controlled through process parameters or structure arrangement. In the case of a fixed a-Si (amorphous silicon) process, it is able to increase the on-state current Ion and decrease the leakage current Ioff through adjusting a thickness of a film layer. When such relevant conditions as process conditions are determined, specific structural designs are provided for thin film transistors having different functions in the driving circuit, so as to ensure a large charging rate and a small falling time Tf. That is, in the case where μ, $C_x$, Vgs, Vds and Vth (Vth is a threshold voltage of the thin film transistor) are constant, it is able to optimize an efficiency of the driving circuit through the design of W/L.

In at least one embodiment of the present disclosure, the driving circuit further includes a transistor for denoising a carry signal output end, and a transistor for denoising the driving signal output end. A length of a channel of the transistor for denoising the carry signal output end is a third length L3, a length of a channel of the transistor for denoising the driving signal output end is a fourth length L4, and the third length L3 is not equal to the second length L2, and the fourth length L4 is not equal to the second length L2.

In at least one embodiment of the present disclosure, the length (i.e., the third length L3) of the channel of the transistor for denoising the carry signal output end is not equal to the length (i.e., the second length L2) of the channel of each of at least a part of the multiple transistors for driving, and the length (i.e., the fourth length L4) of the channel of the transistor for denoising the driving signal output end is not equal to the length (i.e., the second length L2) of the channel of each of at least a part of the multiple transistors for driving, so as enhance the driving capability of the transistors for driving with respect to the transistor for denoising the carry signal output end and the transistor for denoising the driving signal output end.

In at least one embodiment of the present disclosure, the third length L3 is greater than the second length L2 and the fourth length is greater than the second length L2, so as to relatively reduce the width-to-length ratio of the transistor for denoising the carry signal output end and the width-to-length ratio of the transistor for denoising the driving signal output end, thereby to relatively increase the width-to-length ratio of the transistor for driving.

In a possible embodiment of the present disclosure, the third length L3 is greater than or equal to 5.5 μm and smaller than or equal to 9 μm. For example, L3 may be 5.5 μm, 6 μm, 6.5 μm, 7 μm, 7.5 μm, 8 μm, 8.5 μm, or 9 μm. The fourth length L4 is greater than or equal to 5.5 μm and smaller than or equal to 9 μm. For example, L4 may be 5.5 μm, 6 μm, 6.5 μm, 7 μm, 7.5 μm, 8 μm, 8.5 μm or 9 μm. The second length L2 is greater than or equal to 2 μm and smaller than or equal to 5.0 μm. For example, L2 may be 2 μm, 2.5 μm, 2.8 μm, 3 μm, 3.2 μm, 3.5 μm, 3.8 μm, 4 μm, 4.3 μm, 4.5 μm or 5 μm. A ratio of the third length L3 to the second length L2 is greater than or equal to 1.1 and smaller than or equal to 4.5. For example, the ratio of the third length L3 to the second length L2 may be 1.1, 1.3, 1.627, 1.8, 2, 2.3, 2.5, 2.7, 3, 3.2, 3.5, 3.8, 4, 4.2 or 4.5. A ratio of the fourth length L4 to the second length L2 is greater than or equal to 1.1 and smaller than or equal to 4.5. For example, the ratio of the fourth length L4 to the second length L2 may be 1.1, 1.3, 1.627, 1.8, 2, 2.3, 2.5, 2.7, 3, 3.2, 3.5, 3.8, 4, 4.2 or 4.5. However, the present disclosure is not limited thereto.

In at least one embodiment of the present disclosure, the transistors for driving may include a transistor for driving the pull-up node, a transistor for driving a carry signal output end, and a transistor for driving a driving signal output end.

In a possible embodiment of the present disclosure, the driving circuit includes a first transistor, a second transistor, a third transistor and a fourth transistor, and the first transistor, the second transistor, the third transistor and the fourth transistor are the denoising transistors.

A control electrode of the first transistor is electrically connected to a pull-up resetting end, a first electrode of the first transistor is electrically connected to the pull-up node, and a second electrode of the first transistor is electrically connected to a first voltage end.

A control electrode of the second transistor is electrically connected to a first pull-down node, a first electrode of the second transistor is electrically connected to the pull-up node, and a second electrode of the second transistor is electrically connected to the first voltage end.

A control electrode of the third transistor is electrically connected to a second pull-down node, a first electrode of the third transistor is electrically connected to the pull-up node, and a second electrode of the third transistor is electrically connected to the first voltage end.

A control electrode of the fourth transistor is electrically connected to an ON voltage end, a first electrode of the fourth transistor is electrically connected to the pull-up node, and a second electrode of the fourth transistor is electrically connected to the first voltage end.

In at least one embodiment of the present disclosure, the first transistor, the second transistor, the third transistor and the fourth transistor are transistors for denoising the pull-up node, and the first transistor, the second transistor, the third transistor and the fourth transistor may be the denoising transistors.

In a possible embodiment of the present disclosure, the driving circuit includes a fifth transistor and a sixth transistor, and the fifth transistor and the sixth transistor are the denoising transistors.

A control electrode of the fifth transistor is electrically connected to the pull-up node, a first electrode of the fifth transistor is electrically connected to a first pull-down control node, and a second electrode of the fifth transistor is electrically connected to the first voltage end.

A control electrode of the sixth transistor is electrically connected to the pull-up node, a first electrode of the sixth transistor is electrically connected to a second pull-down control node, and a second electrode of the sixth transistor is electrically connected to the first voltage end.

In at least one embodiment of the present disclosure, the fifth transistor is a transistor for denoising the first pull-down control node under the control of the potential at the pull-up node, the sixth transistor is a transistor for denoising the second pull-down control node under the control of the potential at the pull-up node, both the fifth transistor and the sixth transistor are electrically connected to the pull-up node, and the fifth transistor and the sixth transistor may be the denoising transistors.

In at least one embodiment of the present disclosure, at least one of a length of a channel of the first transistor, a length of a channel of the second transistor, a length of a channel of the third transistor, a length of a channel of the fourth transistor, a length of a channel of the fifth transistor, and a length of a channel of the sixth transistor is the first length L1.

During the implementation, at least one of the length of the channel of the first transistor, the length of the channel of the second transistor, the length of the channel of the third transistor, the length of the channel of the fourth transistor, the length of the channel of the fifth transistor, and the length of the channel of the sixth transistor may be relatively increased, so as to reduce at least one of a width-to-length ratio of the first transistor, a width-to-length ratio of the second transistor, a width-to-length ratio of the third transistor, a width-to-length ratio of the fourth transistor, a width-to-length ratio of the fifth transistor, and a width-to-length ratio of the sixth transistor. Accordingly, a leakage current Ioff of at least one of the first transistor, the second transistor, the third transistor, the fourth transistor, the fifth transistor and the sixth transistor is reduced, so as to mitigate the current leakage at the pull-up node, and ensure that the gate electrode of the transistor for driving the driving signal output end is sufficiently turned on, thereby to reduce the falling time Tf of the driving signal from the driving signal output end and mitigate the occurrence of horizontal Mura.

In at least one embodiment of the present disclosure, at least one of the length of the channel of the first transistor, the length of the channel of the second transistor, the length of the channel of the third transistor, the length of the channel of the fourth transistor, the length of the channel of the fifth transistor, and the length of the channel of the sixth transistor may be increased from 4.3 μm to 7 μm, so as to reduce the leakage current of the corresponding transistor.

In a possible embodiment of the present disclosure, the driving circuit further includes a seventh transistor, an eighth transistor and a ninth transistor, and the seventh transistor, the eighth transistor, and the ninth transistor are driving transistors for driving.

A control electrode of the seventh transistor is electrically connected to the pull-up node, a first electrode of the seventh transistor is electrically connected to a clock signal end, and a second electrode of the seventh transistor is electrically connected to the driving signal output end.

A control electrode of the eighth transistor is electrically connected to the pull-up node, a first electrode of the eighth transistor is electrically connected to the clock signal end, and a second electrode of the eighth transistor is electrically connected to the carry signal output end.

A control electrode of the ninth transistor is electrically connected to a first input end, a first electrode of the ninth transistor is electrically connected to a second input end, and a second electrode of the ninth transistor is electrically connected to the pull-up node.

During the implementation, the seventh transistor is a transistor for driving the driving signal output, the eighth transistor is a transistor for driving the carry signal output end, and the ninth transistor is a transistor for driving the pull-up node.

In at least one embodiment of the present disclosure, the first input end is electrically connected to a carry signal output end of an adjacent previous-level driving circuit, the second input end is electrically connected to a driving signal output end of the adjacent previous-level driving circuit, and the second electrode of the ninth transistor is electrically connected to the pull-up node.

In at least one embodiment of the present disclosure, at least one of a length of a channel of the seventh transistor, a length of a channel of the eighth transistor, and a length of a channel of the ninth transistor is the second length L2.

In a possible embodiment of the present disclosure, the driving circuit further includes a tenth transistor, an eleventh transistor, a twelfth transistor and a thirteenth transistor.

A control electrode of the tenth transistor is electrically connected to the first pull-down node, a first electrode of the tenth transistor is electrically connected to a driving signal output end, and a second electrode of the tenth transistor is electrically connected to a second voltage end, A control electrode of the eleventh transistor is electrically connected to the second pull-down node, a first electrode of the eleventh transistor is electrically connected to the driving signal output end, and a second electrode of the eleventh transistor is electrically connected to the second voltage end.

A control electrode of the twelfth transistor is electrically connected to the first pull-down node, a first electrode of the twelfth transistor is electrically connected to the carry signal output end, and a second electrode of the twelfth transistor is electrically connected to the first voltage end.

A control electrode of the thirteenth transistor is electrically connected to the second pull-down node, a first electrode of the thirteenth transistor is electrically connected to the carry signal output end, and a second electrode of the thirteenth transistor is electrically connected to the first voltage end.

The tenth transistor and the eleventh transistor are transistors for denoising the driving signal output end, and the twelfth transistor and the thirteenth transistor are transistors for denoising the carry signal output end.

A length of a channel of the tenth transistor and a length of a channel of the eleventh transistor are each a third length L3, and a length of a channel of the twelfth transistor and a length of a channel of the thirteenth transistor are each a fourth length L4.

In a possible embodiment of the present disclosure, the driving circuit further includes a fourteenth transistor, a fifteenth transistor, a sixteenth transistor, a seventeenth transistor, an eighteenth transistor, a nineteenth transistor, a twentieth transistor, a twenty-first transistor and a capacitor.

A control electrode of the fourteenth transistor and a first electrode of the fourteenth transistor are electrically connected to a first control voltage end, and a second electrode of the fourteenth transistor is electrically connected to a first pull-down control node.

A control electrode of the fifteenth transistor and a first electrode of the fifteenth transistor are electrically connected to a second control voltage end, and a second electrode of the fifteenth transistor is electrically connected to a second pull-down control node.

A control electrode of the sixteenth transistor is electrically connected to the pull-up node, a first electrode of the sixteenth transistor is electrically connected to the first pull-down node, and a second electrode of the sixteen transistor is electrically connected to the first voltage end.

A control electrode of the seventeenth transistor is electrically connected to the pull-up node, a first electrode of the seventeenth transistor is electrically connected to the second pull-down node, and a second electrode of the seventeenth transistor is electrically connected to the first voltage end.

A control electrode of the eighteenth transistor is electrically connected to the first pull-down control node, a first electrode of the eighteenth transistor is electrically connected to the first control voltage end, and a second electrode of the eighteenth transistor is electrically connected to the first pull-down node.

A control electrode of the nineteenth transistor is electrically connected to the second pull-down control node, a first electrode of the nineteenth transistor is electrically connected to the second control voltage end, and a second electrode of the nineteenth transistor is electrically connected to the second pull-down node.

A control electrode of the twentieth transistor is electrically connected to the first input end, a first electrode of the twentieth transistor is electrically connected to the first pull-down node, and a second electrode of the twentieth transistor is electrically connected to the first voltage end.

A control electrode of the twenty-first transistor is electrically connected to the first input end, a first electrode of the twenty-first transistor is electrically connected to the second pull-down node, and a second electrode of the twenty-first transistor is electrically connected to the first voltage end.

During the implementation, the fourteenth transistor, the fifteenth transistor, the sixteenth transistor, the seventeenth transistor, the eighteenth transistor, the nineteenth transistor, the twentieth transistor and the twenty-first transistor are used to control a potential at the first pull-down node and a potential at the second pull-down node.

As shown in FIG. 1, the driving circuit may include a first transistor M1, a second transistor M2, a third transistor M3, a fourth transistor M4, a fifth transistor M5, a sixth transistor M6, a seventh transistor M7, an eighth transistor M8, a ninth transistor M9, a tenth transistor M10, an eleventh transistor M11, a twelfth transistor M12, a thirteenth transistor M13, a fourteenth transistor M14, a fifteenth transistor M15, a sixteenth transistor M16, a seventeenth transistor M17, an eighteenth transistor M18, a nineteenth transistor M19, a twentieth transistor M20, a twenty-first transistor M21 and a capacitor C1.

A gate electrode of the first transistor M1 is electrically connected to a pull-up resetting end RI, a first electrode of the first transistor M1 is electrically connected to a pull-up node PU, and a second electrode of the first transistor M1 is electrically connected to a first low voltage end LVSS.

A gate electrode of the second transistor M2 is electrically connected to a first pull-down node PD1, a first electrode of the second transistor M2 is electrically connected to the pull-up node PU, and a second electrode of the second transistor M2 is electrically connected to the first low voltage end LVSS.

A gate electrode of the third transistor M3 is electrically connected to a second pull-down node PD2, a first electrode of the third transistor M3 is electrically connected to the pull-up node PU, and a second electrode of the third transistor M3 is electrically connected to the first low voltage end LVSS.

A gate electrode of the fourth transistor M4 is electrically connected to an ON voltage end STV, a first electrode of the fourth transistor M4 is electrically connected to the pull-up node PU, and a second electrode of the fourth transistor M4 is electrically connected to the first low voltage end LVSS.

A gate electrode of the fifth transistor M5 is electrically connected to the pull-up node PU, a first electrode of the fifth transistor is electrically connected to a first pull-down control node PDCN1, and a second electrode of the fifth transistor M5 is electrically connected to the first low voltage end LVSS.

Agate electrode of the sixth transistor M6 is electrically connected to the pull-up node PU, a first electrode of the sixth transistor M6 is electrically connected to a second pull-down control node PDCN2, and a second electrode of the sixth transistor M6 is electrically connected to the first low voltage end LVSS.

A gate electrode of the seventh transistor M7 is electrically connected to the pull-up node PU, a first electrode of the seventh transistor M7 is electrically connected to a clock signal end K1, and a second electrode of the seventh transistor M7 is electrically connected to a driving signal output end GO.

A gate electrode of the eighth transistor M8 is electrically connected to the pull-up node PU, a first electrode of the eighth transistor M8 is electrically connected to the clock signal end K1, and a second electrode of the eighth transistor M8 is electrically connected to the carry signal output end OC.

A gate electrode of the ninth transistor M9 is electrically connected to a first input end I1, a first electrode of the ninth transistor M9 is electrically connected to a second input end I2, and a second electrode of the ninth transistor M9 is electrically connected to the pull-up node PU.

A gate electrode of the tenth transistor M10 is electrically connected to the first pull-down node PD1, a first electrode of the tenth transistor M10 is electrically connected to the driving signal output end GO, and a second electrode of the tenth transistor M10 is electrically connected to a second low voltage end VSS.

A gate electrode of the eleventh transistor M11 is electrically connected to the second pull-down node PD2, a first electrode of the eleventh transistor M11 is electrically connected to the driving signal output end GO, and a second electrode of the eleventh transistor M11 is electrically connected to the second low voltage end VSS.

Agate electrode of the twelfth transistor M12 is electrically connected to the first pull-down node PD1, a first electrode of the twelfth transistor M12 is electrically connected to the carry signal output end OC, and a second electrode of the twelfth transistor M12 is electrically connected to the first low voltage end LVSS.

Agate electrode of the thirteenth transistor M13 is electrically connected to the second pull-down node PD2, a first electrode of the thirteenth transistor M13 is electrically connected to the carry signal output end OC, and a second electrode of the thirteenth transistor M13 is electrically connected to the first low voltage end LVSS.

Agate electrode of the fourteenth transistor M14 and a first electrode of the fourteenth transistor M14 are electrically connected to a first control voltage end VDDO, and a second electrode of the fourteenth transistor M14 is electrically connected to the first pull-down control node PDCN1.

A gate electrode of the fifteenth transistor M15 and a first electrode of the fifteenth transistor M15 are electrically connected to a second control voltage end VDDE, and a second electrode of the fifteenth transistor M15 is electrically connected to the second pull-down control node PDCN2.

A gate electrode of the sixteenth transistor M16 is electrically connected to the pull-up node PU, a first electrode of the sixteenth transistor M16 is electrically connected to the first pull-down node PD1, and a second electrode of the sixteen transistor M16 is electrically connected to the first low voltage end LVSS.

A gate electrode of the seventeenth transistor M17 is electrically connected to the pull-up node PU, a first electrode of the seventeenth transistor M17 is electrically connected to the second pull-down node PD2, and a second electrode of the seventeenth transistor M17 is electrically connected to the first low voltage end LVSS.

Agate electrode of the eighteenth transistor M18 is electrically connected to the first pull-down control node PDCN1, a first electrode of the eighteenth transistor M18 is electrically connected to the first control voltage end VDDO, and a second electrode of the eighteenth transistor M18 is electrically connected to the first pull-down node PD1.

A gate electrode of the nineteenth transistor M19 is electrically connected to the second pull-down control node PDCN2, a first electrode of the nineteenth transistor M19 is electrically connected to the second control voltage end VDDE, and a second electrode of the nineteenth transistor M19 is electrically connected to the second pull-down node PD2.

A gate electrode of the twentieth transistor M20 is electrically connected to the first input end I1, a first electrode of the twentieth transistor M20 is electrically connected to the first pull-down node PD1, and a second electrode of the twentieth transistor M20 is electrically connected to the first low voltage end LVSS.

A gate electrode of the twenty-first transistor M21 is electrically connected to the first input end I1, a first electrode of the twenty-first transistor M21 is electrically connected to the second pull-down node PD2, and a second electrode of the twenty-first transistor M21 is electrically connected to the first low voltage end LVSS.

In the driving circuit shown in FIG. 1, the first voltage end is, but not limited to, the first low voltage end LVSS and the second voltage end is, but not limited to, the second low voltage end VSS.

In the driving circuit shown in FIG. 1, the first input end I1 is electrically connected to a carry signal output end of an adjacent previous-level driving circuit, and the second input end I2 is electrically connected to the driving signal output end of the adjacent previous-level driving circuit, as shown in FIG. 1, namely, the carry signal output end OC and the driving signal output end GO. It should be appreciated that the expression "adjacent previous-level driving circuit" is not limited to a previous-level GOA immediately adjacent to the current-level GOA, but may also refer to a previous-level GOA spaced apart from the current-level GOA by several levels of GOA. It depends mainly on a sequence or cascaded connection relationship of a specific GOA circuit, which will not be particularly defined herein.

In at least one embodiment of the present disclosure, the first electrode may be a source electrode or a drain electrode, and the second electrode may be a drain electrode or a source electrode.

In at least one embodiment of the present disclosure, the length of the channel of the first transistor M1, the length of the channel of the second transistor M2, the length of the channel of the third transistor M3, the length of the channel of the fourth transistor M4, the length of the channel of the fifth transistor M5, and the length of the channel of the sixth transistor M6 may be set as the first length L1, and the length of the channel of the tenth transistor M10 and the length of the channel of the eleventh transistor M11 may be set as the third length L3. The length of the channel of the twelfth transistor M12 and the length of the channel of the thirteenth transistor M13 are each the fourth length L4, and the first length L1, the third length L3 and the fourth length L4 may each be, but not limited to, 7 μm.

A length of a channel of each transistors apart from the first transistor M1, the second transistor M2, the third transistor M3, the fourth transistor M4, the fifth transistor M5, the sixth transistor M6, the tenth transistor M10, the eleventh transistor M11, the twelfth transistor M12 and the thirteenth transistor M13 in the driving circuit is, but not limited to, set as 4.3 μm.

In the related art, when performing a cutting experiment for verification, lengths of channels of transistors in the driving circuit in FIG. 1 may be set to be the same, and then after cutting M1, current leakage at PU is slightly mitigated. In addition to M1, M9 is further cut, the current leakage at PU is mitigated significantly. In addition to M1 and M9, M5 is further cut, the current leakage at PU is further mitigated. In addition to M1, M9 and M5, M4 is further cut, the current leakage at PU is still further mitigated. After cutting the transistor, a width of a channel of the transistor becomes smaller.

Figure 2:
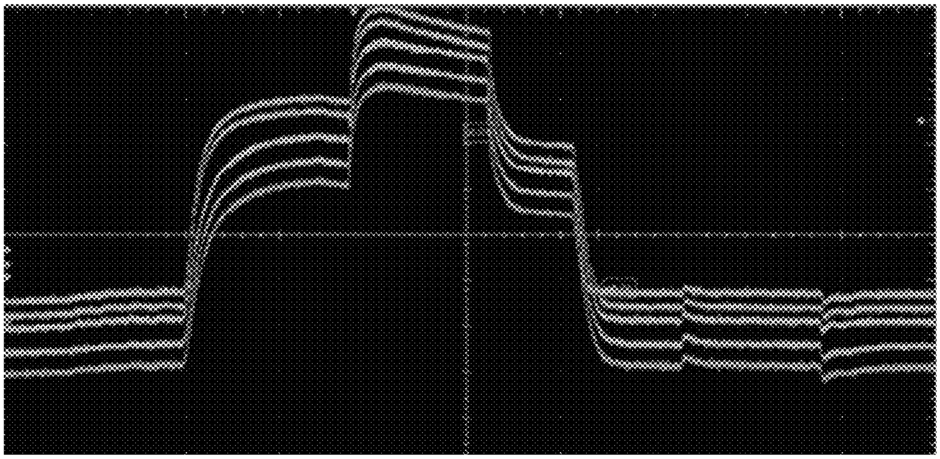
FIG. 2 is a waveform diagram of a potential at a pull-up node PU when cutting each transistor in the related art.

In FIG. 2, curves from top to bottom are a schematic diagram of a potential at PU without cutting, a schematic diagram of the potential at PU after cutting M1, a schematic diagram of the potential at PU after cutting M1 and M9, a schematic diagram of the potential at PU after cutting M1, M9 and M5, and a schematic diagram of the potential at PU after cutting M1, M9, M5 and M4.

Changing a width of a channel of each transistor has a greater effect on the spatial layout, and changing a length of a channel of each transistor does not significantly change the layout, so, in at least one embodiment of the present disclosure, a length of a channel of each of a part of transistors is changed, thereby to facilitate the layout.

Figure 3:
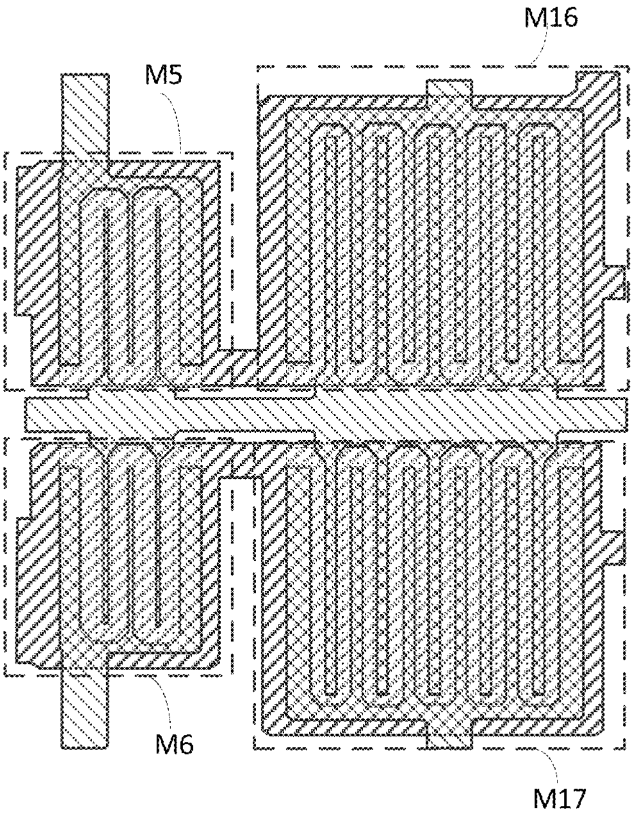
FIG. 3 is a schematic view showing the layout of a fifth transistor M5, a sixth transistor M6, a sixteenth transistor M16 and a seventeenth transistor M17 in FIG. 1.

FIG. 3 is a schematic view showing the layout of the fifth transistor M5, the sixth transistor M6, the sixteenth transistor M16 and the seventeenth transistor M17 in FIG. 1.

In FIG. 3, a gate metal layer, an active layer and a source/drain metal layer are arranged sequentially from bottom to top in a direction perpendicular to the paper. The gate metal layer includes the gate electrode of each transistor, the active layer includes the channel of each transistor, and the source/drain metal layer includes the first electrode of each transistor and the second electrode of each transistor. The gate metal layer, the active layer and the source/drain metal layer are laminated one on another above the base substrate.

Figure 4:
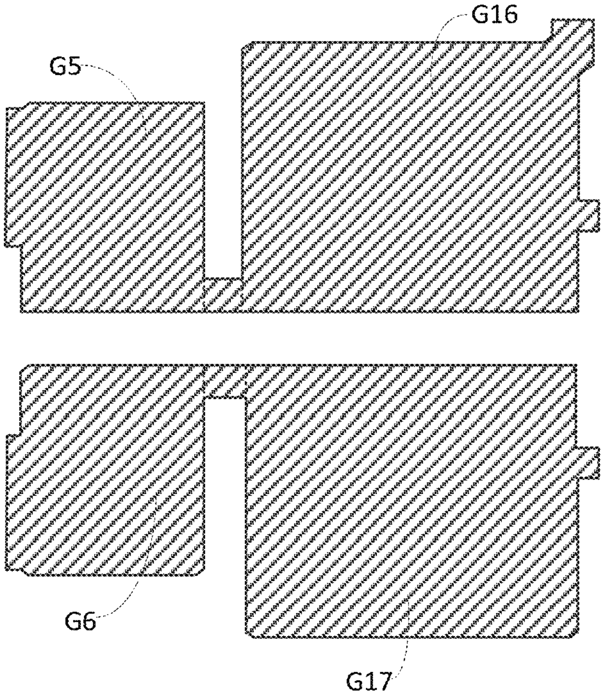
FIG. 4 is a schematic view showing the layout of a gate metal layer in FIG. 3.
Figure 5:
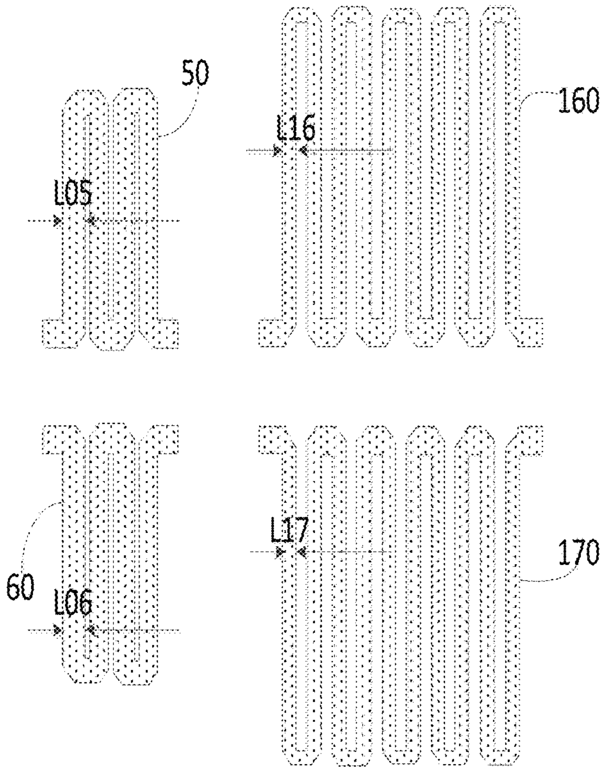
FIG. 5 is a schematic view showing the layout of an active layer in FIG. 3.
Figure 6:
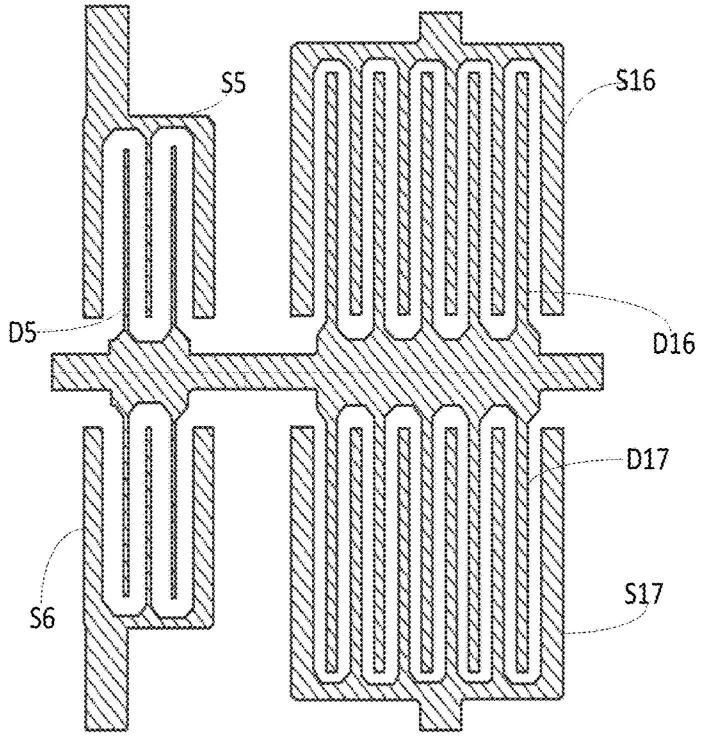
FIG. 6 is a schematic view showing a source/drain metal layer of FIG. 3.

FIG. 4 is a schematic view showing the layout of the gate metal layer in FIG. 3, FIG. 5 is a schematic view showing the layout of the active layer in FIG. 3, and FIG. 6 is a schematic view showing the source/drain metal layer in FIG. 3.

In FIG. 4, G5 denotes the gate electrode of M5, G6 denotes the gate electrode of M6, G16 denotes the gate electrode of M16, and G17 denotes the gate electrode of M7.

In FIG. 5, 50 denotes the channel of M5, 60 denotes the channel of M6, 160 denotes the channel of M16, and 170 denotes the channel of M17.

The length of the channel 50 of M5 and the length of the channel 60 of M6 are the first length L1, and the L1 is 7 μm.

The length of the channel 160 of M16 and the length of the channel 170 of M17 are the second length L2, and the L2 is 4.3 μm.

In at least one embodiment of the present disclosure, the length of the channel of each transistor is a line width of an orthogonal projection of the channel onto the base substrate, and the width of the channel is a length of the orthogonal projection of the channel onto the base substrate.

As shown in FIG. 5, the length L05 of the channel 50 of M5 is a line width of an orthogonal projection of the channel 50 onto the base substrate. The length L06 of the channel 60 of M6 is a line width of an orthogonal projection of the channel 60 onto the base substrate. The length L16 of the channel 160 of M16 is a line width of an orthogonal projection of the channel 160 onto the base substrate. The length L17 of the channel 170 of M17 is a line width of an orthogonal projection of the channel 170 onto the base substrate.

Figure 7:
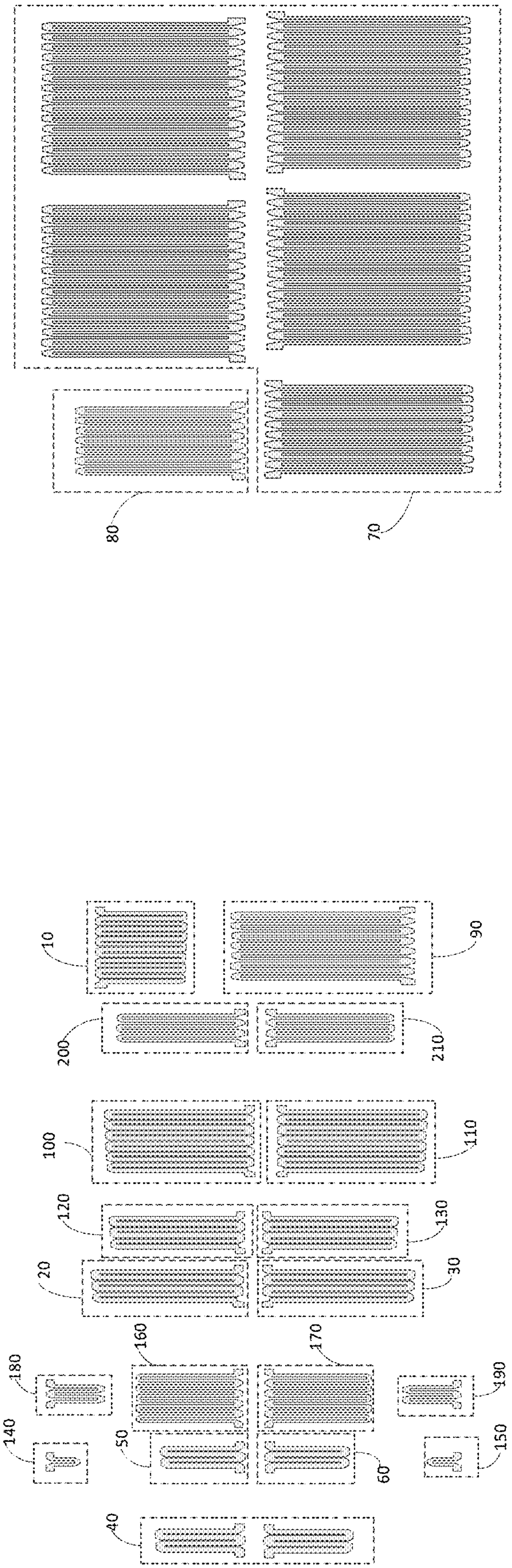
FIG. 7 is a schematic view showing an active layer of each transistor in the driving circuit of FIG. 1.

FIG. 7 is a schematic view showing the active layer of each transistor in the driving circuit in FIG. 1.

In FIG. 7, 10 denotes the channel of M1, 20 denotes the channel of M2, 30 denotes the channel of M3, 40 denotes the channel of M4, 50 denotes the channel of M5, 60 denotes the channel of M6, 70 denotes the channel of M8, 80 denotes the channel of M8, 90 denotes the channel of M9, 100 denotes the channel of M10, 110 denotes the channel of M11, 120 denotes the channel of M12, 130 denotes the channel of M13, 140 denotes the channel of M14, 150 denotes the channel of M15, 160 denotes the channel of M16, 17 denotes the channel of M7, 180 denotes the channel of M18, 190 denotes the channel of M19, 200 denotes the channel of M4, and 210 denotes the channel of M21.

Figure 8:
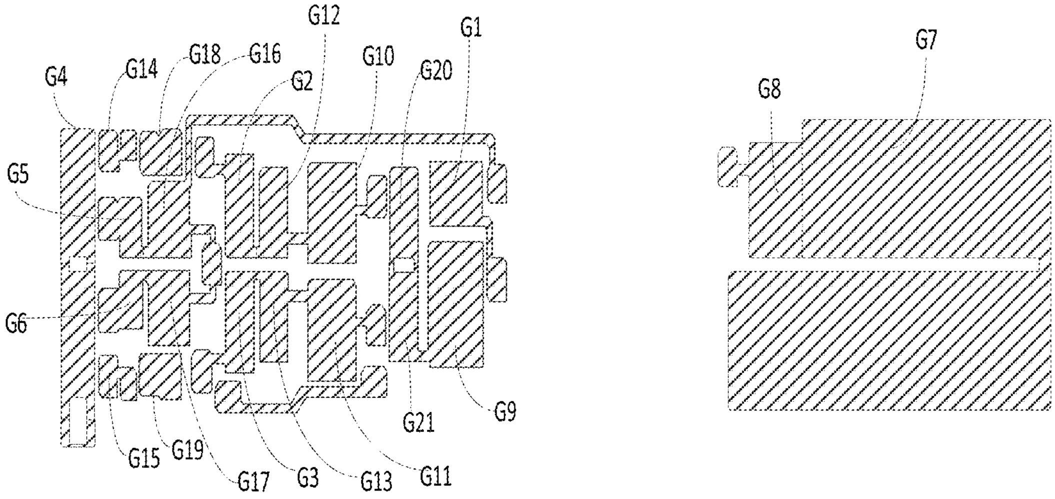
FIG. 8 is a schematic view showing a gate electrode of each transistor in the driving circuit of FIG. 1.

FIG. 8 is a schematic view showing the gate electrode of each transistor in the driving circuit of FIG. 1, and the gate electrode is in the gate metal layer.

In FIG. 8, G1 denotes the gate electrode of M1, G2 denotes the gate electrode of M2, G3 denotes the gate electrode of M3, G4 denotes the gate electrode of M4, G5 denotes the gate electrode of M5, G6 denotes the gate electrode of M6, G7 denotes the gate electrode of M7, G8 denotes the gate electrode of M8, G9 denotes the gate electrode of M9, G10 denotes the gate electrode of M10, G11 denotes the gate electrode of M11, G12 denotes the gate electrode of M12, G13 denotes the gate electrode of M13, G14 denotes the gate electrode of M14, G15 denotes the gate electrode of M15, G16 denotes the gate electrode of M16, G17 denotes the gate electrode of M17, G18 denotes the gate electrode of M18, G19 denotes the gate electrode of M19, G20 denotes the gate electrode of M20, and G21 denotes the gate electrode of M21.

Figure 9:
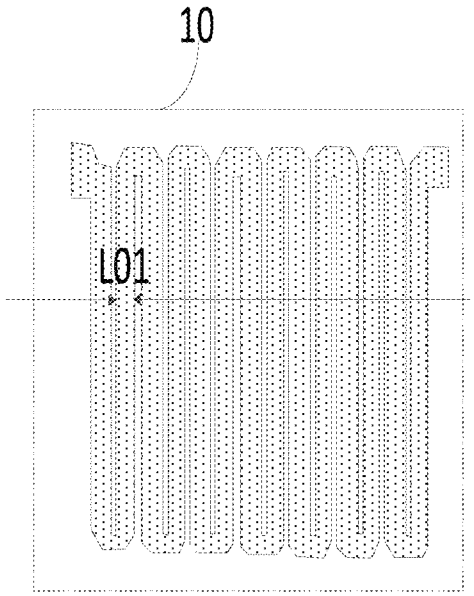
FIG. 9 is a schematic view showing a channel 10 of M1.

As shown in FIG. 9, the length L01 of the channel 10 of M1 is the first length L1. The length L01 of the channel 10 of M1 is a line width of an orthogonal projection of the channel 10 onto the base substrate.

Figure 10:
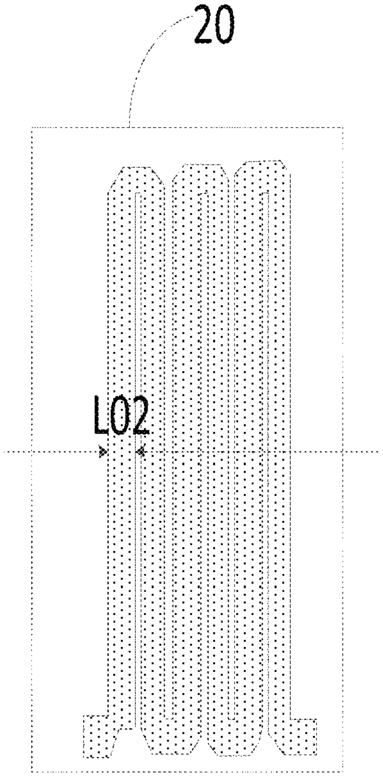
FIG. 10 is a schematic view showing a channel 20 of M2.

As shown in FIG. 10, the length L02 of the channel 20 of M2 is the first length L1. The length L02 of the channel 20 of M2 is the line width of an orthogonal projection of the channel 20 onto the base substrate.

Figure 11:
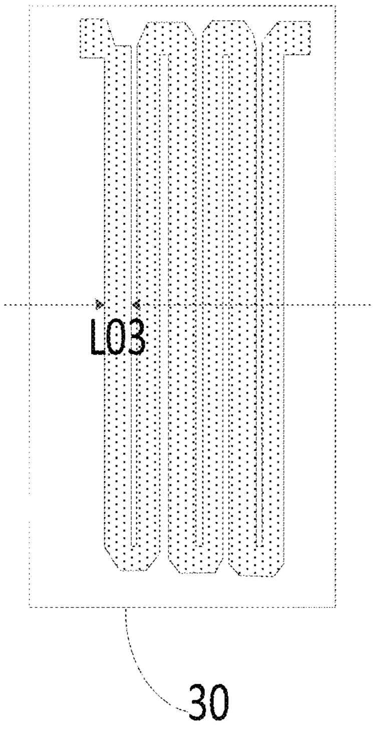
FIG. 11 is a schematic view showing a channel 30 of M3.

As shown in FIG. 11, the length L03 of the channel 30 of M3 is the first length L1. The length L03 of the channel 30 of M3 is a line width of an orthogonal projection of the channel 30 onto the base substrate.

Figure 12:
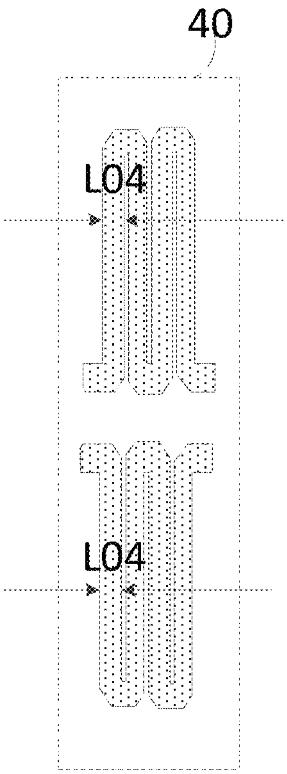
FIG. 12 is a schematic view showing a channel 40 of M4.

As shown in FIG. 12, the length L04 of the channel 40 of M4 is the first length L1. The length L04 of the channel 40 of M4 is a line width of an orthogonal projection of the channel 40 onto the base substrate.

As shown in FIG. 12, the channel 40 of M4 includes two channel portions, a line width of an orthogonal projection of each channel portion onto the base substrate is L04.

Figure 13:
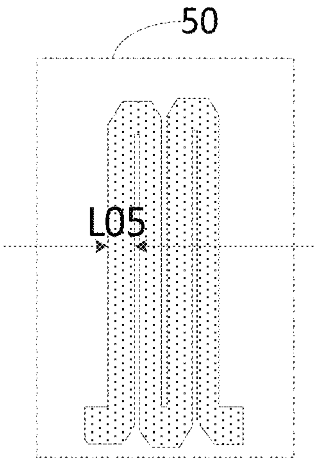
FIG. 13 is a schematic view showing a channel 50 of M5.

As shown in FIG. 13, the length L05 of the channel 50 of M5 is the first length L1. The length L05 of the channel 50 of M5 is a line width of an orthogonal projection of the channel 50 onto the base substrate.

Figure 14:
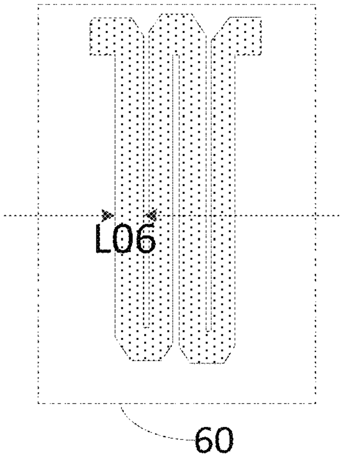
FIG. 14 is a schematic view showing a channel 60 of M6.

As shown in FIG. 14, the length L06 of the channel 60 of M6 is the first length L1. The length L06 of the channel 60 of M6 is a line width of an orthogonal projection of the channel 60 onto the base substrate.

In at least one embodiment shown in FIG. 7, the first length L1 may be, but not limited to, 7 μm.

Figure 15:
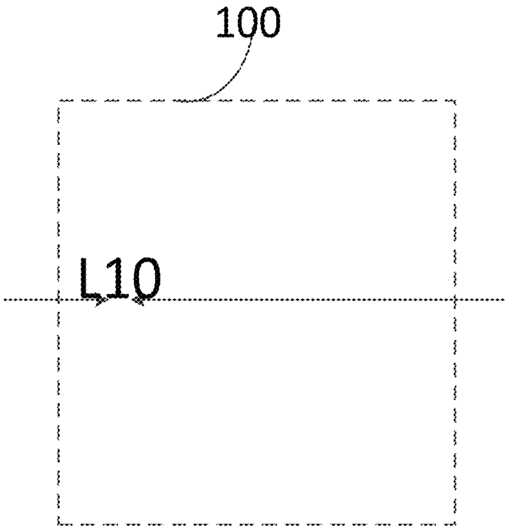
FIG. 15 is a schematic view showing a channel 100 of M10.

As shown in FIG. 15, the length L10 of the channel 100 of M10 is the third length L3.

Figure 16:
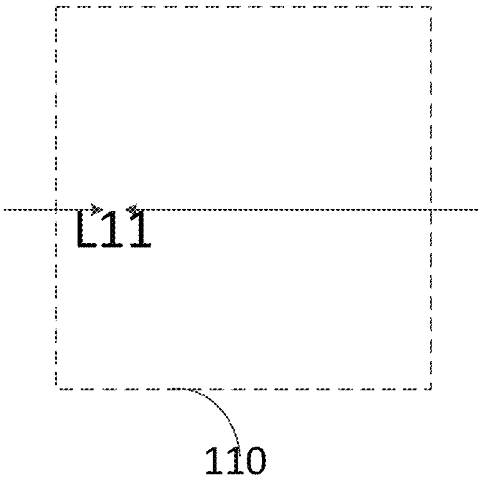
FIG. 16 is a schematic view showing a channel 110 of M11.

As shown in FIG. 16, the length L11 of the channel 110 of M11 is the third length L3.

Figure 17:
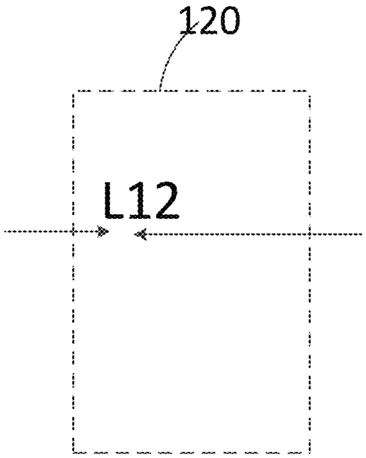
FIG. 17 is a schematic view showing a channel 120 of M12.

As shown in FIG. 17, the length L12 of the channel 120 of M12 is the fourth length L4.

Figure 18:
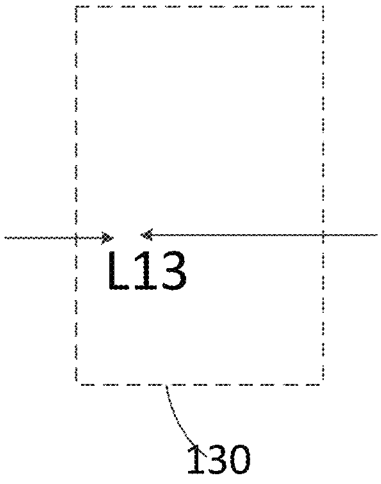
FIG. 18 is a schematic view showing a channel 130 of M13.

As shown in FIG. 18, the length L13 of the channel 130 of M13 is the fourth length L4.

In FIG. 7, the third length L3 may be, but not limited to, 7 μm and the fourth length L4 may be, but not limited to, 7 μm.

Figure 19:
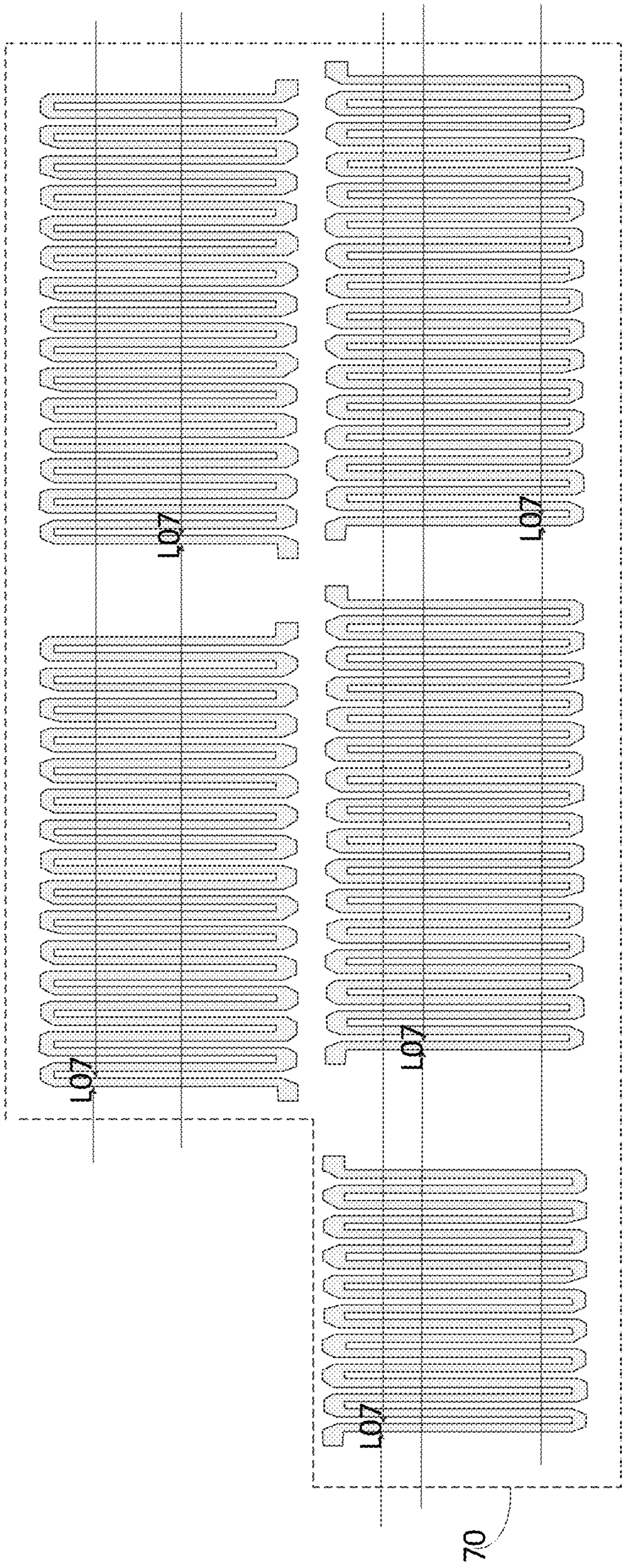
FIG. 19 is a schematic view showing a channel 70 of M7.

As shown in FIG. 19, the length L07 of the channel 70 of M7 is the second length L2.

As shown in FIG. 19, the channel 70 of M7 includes five channel portions, a line width of an orthogonal projection of each channel portion onto the base substrate is L07.

Figure 20:
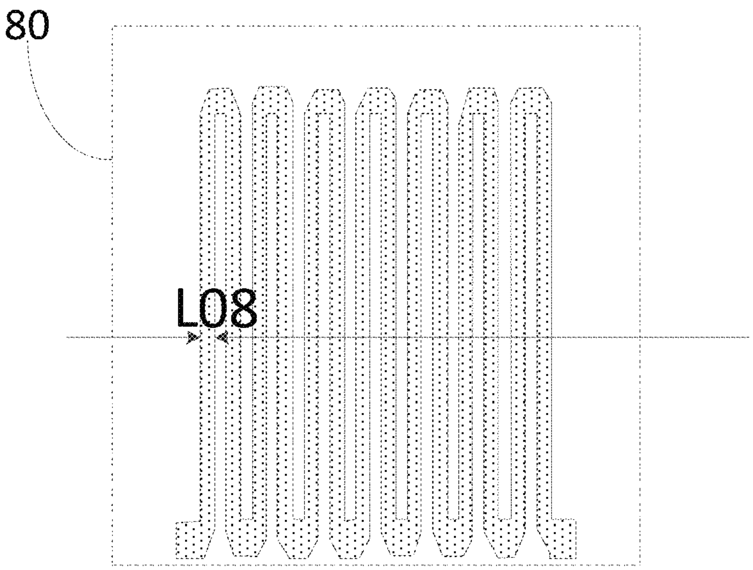
FIG. 20 is a schematic view showing a channel 80 of M8.

As shown in FIG. 20, the length L08 of the channel 80 of M8 is the second length L2.

Figure 21:
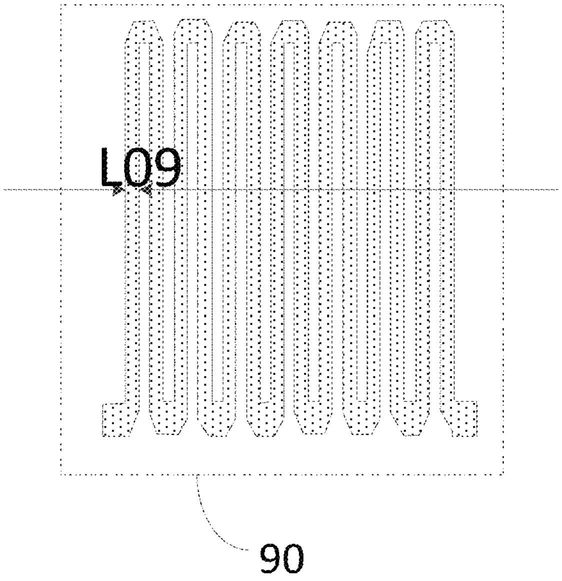
FIG. 21 is a schematic view showing a channel 90 of M9.

As shown in FIG. 21, the length L09 of the channel 90 of M9 is the second length L2.

In FIG. 7, the second length L2 may be, but not limited to, 4.3 μm.

In FIG. 7, the length of the channel of M14, the length of the channel of M15, the length of the channel of M16, the length of the channel of M17, the length of the channel of M18, the length of the channel of M19, the length of the channel of M20, and the length of the channel of M21 may each be, but not limited to, 4.3 μm.

In at least one embodiment of the present disclosure, a width-to-length ratio of the first transistor is B1, a width-to-length ratio of the ninth transistor is A1, a width-to-length ratio of the fourth transistor is B2, both a width-to-length ratio of the second transistor and a width-to-length ratio of the third transistor are B3, and a width-to-length ratio of the seventh transistor is A2. Both a width-to-length ratio of the tenth transistor and a width-to-length ratio of the eleventh transistor are B4, and both a width-to-length ratio of the twelfth transistor and a width-to-length ratio of the thirteenth transistor are B5.

B1/A1 is greater than or equal to 0.1 and smaller than or equal to 0.8. For example, B1/A1 may be 0.1, 0.13, 0.15, 0.18, 0.22, 0.25, 0.27, 0.3, 0.35, 0.4, 0.45, 0.5, 0.53, 0.58, 0.6, 0.68, 0.75 or 0.8.

B2/A1 is greater than or equal to 0.005 and smaller than or equal to 0.5. For example B2/A1 may be 0.005, 0.008, 0.010, 0.015, 0.020, 0.025, 0.026, 0.030, 0.040, 0.050, 0.1, 0.15, 0.2, 0.3, 0.4 or 0.5.

B3/A1 is greater than or equal to 0.01 and smaller than or equal to 0.5. For example B3/A1 may be 0.005, 0.008, 0.010, 0.015, 0.020, 0.025, 0.026, 0.030, 0.040, 0.050, 0.1, 0.15, 0.2, 0.3, 0.4 or 0.5.

B4/A1 is greater than or equal to 0.04 and smaller than or equal to 0.4. For example, B4/A1 may be 0.04, 0.06, 0.08, 0.1, 0.15, 0.2, 0.23, 0.26, 0.3, 0.36 or 0.4.

B5/A1 is greater than or equal to 0.01 and smaller than or equal to 0.3. For example, B5/A1 may be 0.01, 0.02, 0.05, 0.08, 0.1, 0.12, 0.15, 0.18, 0.2, 0.26 or 0.3.

B1/A2 is greater than or equal to 0.02 and smaller than or equal to 0.08. For example, B1/A2 may be 0.02, 0.03, 0.05, 0.06 or 0.08.

B2/A2 is greater than or equal to 0.01 and smaller than or equal to 0.06. For example, B2/A2 may be 0.01, 0.02, 0.03, 0.05 or 0.06.

B3/A2 is greater than or equal to 0.015 and smaller than or equal to 0.05. For example, B3/A2 may be 0.015, 0.02, 0.03, 0.04 or 0.05.

B4/A2 is greater than or equal to 0.004 and smaller than or equal to 0.048. For example, B4/A2 may be 0.004, 0.006, 0.008, 0.01, 0.016, 0.02, 0.03, 0.04 or 0.048.

B5/A2 is greater than or equal to 0.001 and smaller than or equal to 0.045. For example, B5/A2 may be 0.001, 0.002, 0.005, 0.007, 0.009, 0.013, 0.017, 0.019, 0.024, 0.03, 0.036, 0.04 or 0.045.

However, the present disclosure is not limited thereto.

In at least one embodiment of the present disclosure, a width-to-length ratio of the fifth transistor and a width-to-length ratio of the sixth transistor are C1, a width-to-length ratio of the sixteenth transistor is C2, both a width-to-length ratio of the fourteenth transistor and a width-to-length ratio of the fifteenth transistor are C3, and both a width-to-length ratio of the eighteenth transistor and a width-to-length ratio of the nineteenth transistor are C4.

C1/A1 is greater than or equal to 0.03 and smaller than or equal to 0.09. For example, C1/A1 may be 0.03, 0.04, 0.05, 0.06, 0.08 or 0.09;

C2/A1 is greater than or equal to 0.08 and smaller than or equal to 0.6. For example, C2/A1 may be 0.08, 0.1, 0.12, 0.14, 0.16, 0.2, 0.26, 0.32, 0.4, 0.45, 0.52 or 0.6;

C3/A1 is greater than or equal to 0.005 and smaller than or equal to 0.046. For example, C3/A1 may be 0.005, 0.01, 0.015, 0.02, 0.022, 0.024, 0.03, 0.04 or 0.046;

C4/A1 is greater than or equal to 0.03 and smaller than or equal to 0.09. For example, C4/A1 may be 0.03, 0.04, 0.05, 0.06, 0.07, 0.08 or 0.09;

C1/A2 is greater than or equal to 0.005 and smaller than or equal to 0.02. For example, C1/A1 may be 0.005, 0.006, 0.008, 0.01, 0.015, 0.018 or 0.02;

C2/A2 is greater than or equal to 0.01 and smaller than or equal to 0.06. For example, C2/A1 may be 0.01, 0.02, 0.03, 0.04, 0.05 or 0.06;

C3/A2 is greater than or equal to 0.01 and smaller than or equal to 0.05. For example, C3/A1 may be 0.01, 0.02, 0.03, 0.04 or 0.05;

C4/A2 is greater than or equal to 0.003 and smaller than or equal to 0.04. For example, C4/A1 may be 0.003, 0.006, 0.008, 0.01, 0.016, 0.02, 0.025, 0.03, or 0.04.

However, the present disclosure is not limited thereto.

Based on the above-mentioned width-to-length ratios, it is able to ensure that the driving circuit has a high charging rate without setting a transistor for resetting the driving signal, and such defect as current leakage at the pull-up node does not occur.

In at least one embodiment of the present disclosure, the width of the channel of M9 may be greater than or equal to 1800 μm and smaller than or equal to 2400 μm, e.g., 2100 μm.

The width of the channel of M1 may be greater than or equal to 700 μm and smaller than or equal to 1200 μm, e.g., 900 μm.

The width of the channel of M7 may be greater than or equal to 17500 μm and smaller than or equal to 20000 μm, e.g., 18500 μm.

The width of the channel of M18 and the width of the channel of M19 may be greater than or equal to 140 μm and smaller than or equal to 180 μm, e.g., 160 μm.

The width of the channel of M16 and M17 may be greater than or equal to 700 μm and smaller than or equal to 900 μm, e.g., 800 μm.

The width of the channel of M4 may be greater than or equal to 400 μm and smaller than or equal to 600 μm, e.g., 500 μm.

The width of the channel of M5 and the width of the channel of M6 may be greater than or equal to 180 μm and smaller than or equal to 260 μm, e.g., 225 μm.

The width of the channel of M14 and the width of the channel of M15 may be greater than or equal to 25 μm and smaller than or equal to 45 μm, e.g., 35 μm.

The width of the channel of M2 and the width of the channel of M3 are greater than or equal to 600 μm and smaller than or equal to 800 μm, e.g., 700 μm.

The width of the channel of M10 and the width of the channel of M11 may be greater than or equal to 1200 μm and smaller than or equal to 1600 μm, e.g., 1400 μm.

The width of the channel of M12 and the width of the channel of M13 may be greater than or equal to 500 μm and smaller than or equal to 700 μm, e.g., 600 μm.

The width of the channel of M8 may be greater than or equal to 1750 μm and smaller than or equal to 2000 μm, e.g., 1900 μm.

The width of the channel of M20 and the width of the channel of M21 may be greater than or equal to 500 μm and smaller than or equal to 700 μm, e.g., 600 μm;

However, the present disclosure is not limited thereto.

The present disclosure further provides in some embodiments a display device including the above-mentioned display substrate.

The display device may be any product or member having a display function, e.g., mobile phone, tablet computer, television, display, laptop computer, digital photo frame, or navigator.

The above embodiments are for illustrative purposes only, but the present disclosure is not limited thereto. Apparently, a person skilled in the art may make further modifications and improvements without departing from the spirit of the present disclosure, and these modifications and improvements shall also fall within the scope of the present disclosure.

What is claimed is:

1. A display substrate, comprising a base substrate and a driving circuit arranged on the base substrate; wherein the driving circuit comprises multiple denoising transistors and multiple transistors for driving, and the denoising transistors are electrically connected to a pull-up node;
- wherein a length of a channel of each of at least a part of the denoising transistors is a first length L1;
- a length of a channel of each of at least a part of the multiple transistors for driving is a second length L2; and
- the first length L1 is not equal to the second length L2.

2. The display substrate according to claim 1, wherein the first length L1 is greater than the second length L2.

3. The display substrate according to claim 2, wherein the first length L1 is greater than or equal to 5.5 μm and smaller than or equal to 9 μm, the second length L2 is greater than or equal to 2 μm and smaller than or equal to 5.0 μm, and a ratio of the first length L1 to the second length L2 is greater than or equal to 1.1 and smaller than or equal to 4.5.

4. The display substrate according to claim 1, wherein the driving circuit further comprises a transistor for denoising a carry signal output end, and a transistor for denoising a driving signal output end;
- a length of a channel of the transistor for denoising the carry signal output end is a third length L3;
- a length of a channel of the transistor for denoising the driving signal output end is a fourth length L4; and
- the third length L3 is not equal to the second length L2, and the fourth length L4 is not equal to the second length L2.

5. The display substrate according to claim 4, wherein the third length L3 is greater than the second length L2, and the fourth length is greater than the second length L2.

6. The display substrate according to claim 5, wherein the third length L3 is greater than or equal to 5.5 μm and smaller than or equal to 9 μm, the fourth length L4 is greater than or equal to 5.5 μm and smaller than or equal to 9 μm, the second length L2 is greater than or equal to 2 μm and smaller than or equal to 5.0 μm, a ratio of the third length L3 to the second length L2 is greater than or equal to 1.1 and smaller than or equal to 4.5, and a ratio of the fourth length L4 to the second length L2 is greater than or equal to 1.1 and smaller than or equal to 4.5.

7. The display substrate according to claim 1, wherein the transistors for driving comprise a transistor for driving the pull-up node, a transistor for driving a carry signal output end, and a transistor for driving a driving signal output end.

8. The display substrate according to claim 1, wherein the driving circuit comprises a first transistor, a second transistor, a third transistor, a fourth transistor, a fifth transistor and a sixth transistor, and the first transistor, the second transistor, the third transistor and the fourth transistor are the denoising transistors;

a control electrode of the first transistor is electrically connected to a pull-up resetting end, a first electrode of the first transistor is electrically connected to the pull-up node, and a second electrode of the first transistor is electrically connected to a first voltage end;

a control electrode of the second transistor is electrically connected to a first pull-down node, a first electrode of the second transistor is electrically connected to the pull-up node, and a second electrode of the second transistor is electrically connected to the first voltage end;

a control electrode of the third transistor is electrically connected to a second pull-down node, a first electrode of the third transistor is electrically connected to the pull-up node, and a second electrode of the third transistor is electrically connected to the first voltage end; and a control electrode of the fourth transistor is electrically connected to an ON voltage end, a first electrode of the fourth transistor is electrically connected to the pull-up node, and a second electrode of the fourth transistor is electrically connected to the first voltage end.

9. The display substrate according to claim 8, wherein the driving circuit comprises a fifth transistor and a sixth transistor, and the fifth transistor and the sixth transistor are the denoising transistors;

a control electrode of the fifth transistor is electrically connected to the pull-up node, a first electrode of the fifth transistor is electrically connected to a first pull-down control node, and a second electrode of the fifth transistor is electrically connected to the first voltage end; and a control electrode of the sixth transistor is electrically connected to the pull-up node, a first electrode of the sixth transistor is electrically connected to a second pull-down control node, and a second electrode of the sixth transistor is electrically connected to the first voltage end.

10. The display substrate according to claim 9, wherein at least one of a length of a channel of the first transistor, a length of a channel of the second transistor, a length of a channel of the third transistor, a length of a channel of the fourth transistor, a length of a channel of the fifth transistor, and a length of a channel of the sixth transistor is the first length L1.

11. The display substrate according to claim 8, wherein the driving circuit further comprises a seventh transistor, an eighth transistor and a ninth transistor, and the seventh transistor, the eighth transistor and the ninth transistor are the driving transistors for driving;

a control electrode of the seventh transistor is electrically connected to the pull-up node, a first electrode of the seventh transistor is electrically connected to a clock signal end, and a second electrode of the seventh transistor is electrically connected to the driving signal output end;

a control electrode of the eighth transistor is electrically connected to the pull-up node, a first electrode of the eighth transistor is electrically connected to the clock signal end, and a second electrode of the eighth transistor is electrically connected to a carry signal output end; and a control electrode of the ninth transistor is electrically connected to a first input end, a first electrode of the ninth transistor is electrically connected to a second input end, and a second electrode of the ninth transistor is electrically connected to the pull-up node.

12. The display substrate according to claim 11, wherein at least one of a length of a channel of the seventh transistor, a length of a channel of the eighth transistor, and a length of a channel of the ninth transistor is the second length L2.

13. The display substrate according to claim 11, wherein the driving circuit further comprises a tenth transistor, an eleventh transistor, a twelfth transistor and a thirteenth transistor;

a control electrode of the tenth transistor is electrically connected to the first pull-down node, a first electrode of the tenth transistor is electrically connected to a driving signal output end, and a second electrode of the tenth transistor is electrically connected to a second voltage end;

a control electrode of the eleventh transistor is electrically connected to the second pull-down node, a first electrode of the eleventh transistor is electrically connected to the driving signal output end, and a second electrode of the eleventh transistor is electrically connected to the second voltage end;

a control electrode of the twelfth transistor is electrically connected to the first pull-down node, a first electrode of the twelfth transistor is electrically connected to the carry signal output end, and a second electrode of the twelfth transistor is electrically connected to the first voltage end;

a control electrode of the thirteenth transistor is electrically connected to the second pull-down node, a first electrode of the thirteenth transistor is electrically connected to the carry signal output end, and a second electrode of the thirteenth transistor is electrically connected to the first voltage end;

the tenth transistor and the eleventh transistor are transistors for denoising the driving signal output end, and the twelfth transistor and the thirteenth transistor are transistors for denoising the carry signal output end; and a length of a channel of the tenth transistor and a length of a channel of the eleventh transistor are each a third length L3, and a length of a channel of the twelfth transistor and a length of a channel of the thirteenth transistor are each a fourth length L4.

14. The display substrate according to claim 13, wherein the driving circuit further comprises a fourteenth transistor, a fifteenth transistor, a sixteenth transistor, a seventeenth transistor, an eighteenth transistor, a nineteenth transistor, a twentieth transistor, a twenty-first transistor and a capacitor;

a control electrode of the fourteenth transistor and a first electrode of the fourteenth transistor are electrically connected to a first control voltage end, and a second electrode of the fourteenth transistor is electrically connected to a first pull-down control node;

a control electrode of the fifteenth transistor and a first electrode of the fifteenth transistor are electrically connected to a second control voltage end, and a second electrode of the fifteenth transistor is electrically connected to a second pull-down control node;

a control electrode of the sixteenth transistor is electrically connected to the pull-up node, a first electrode of the sixteenth transistor is electrically connected to the first pull-down node, and a second electrode of the sixteen transistor is electrically connected to the first voltage end;

a control electrode of the seventeenth transistor is electrically connected to the pull-up node, a first electrode of the seventeenth transistor is electrically connected to the second pull-down node, and a second electrode of the seventeenth transistor is electrically connected to the first voltage end;

a control electrode of the eighteenth transistor is electrically connected to the first pull-down control node, a first electrode of the eighteenth transistor is electrically connected to the first control voltage end, and a second electrode of the eighteenth transistor is electrically connected to the first pull-down node;

a control electrode of the nineteenth transistor is electrically connected to the second pull-down control node, a first electrode of the nineteenth transistor is electrically connected to the second control voltage end, and a second electrode of the nineteenth transistor is electrically connected to the second pull-down node;

a control electrode of the twentieth transistor is electrically connected to the first input end, a first electrode of the twentieth transistor is electrically connected to the first pull-down node, and a second electrode of the twentieth transistor is electrically connected to the first voltage end; and a control electrode of the twenty-first transistor is electrically connected to the first input end, a first electrode of the twenty-first transistor is electrically connected to the second pull-down node, and a second electrode of the twenty-first transistor is electrically connected to the first voltage end.

15. The display substrate according to claim 14, wherein a width-to-length ratio of the first transistor is B1, a width-to-length ratio of the ninth transistor is A1, a width-to-length ratio of the fourth transistor is B2, both a width-to-length ratio of the second transistor and a width-to-length ratio of the third transistor are B3, and a width-to-length ratio of the seventh transistor is A2;

both a width-to-length ratio of the tenth transistor and a width-to-length ratio of the eleventh transistor are B4, and both a width-to-length ratio of the twelfth transistor and a width-to-length ratio of the thirteenth transistor are B5;

B1/A1 is greater than or equal to 0.1 and smaller than or equal to 0.8, B2/A1 is greater than or equal to 0.005 and smaller than or equal to 0.5, B3/A1 is greater than or equal to 0.01 and smaller than or equal to 0.5, B4/A1 is greater than or equal to 0.04 and smaller than or equal to 0.4, and B5/A1 is greater than or equal to 0.01 and smaller than or equal to 0.3; and B1/A2 is greater than or equal to 0.02 and smaller than or equal to 0.08, B2/A2 is greater than or equal to 0.01 and smaller than or equal to 0.06, B3/A2 is greater than or equal to 0.015 and smaller than or equal to 0.05, B4/A2 is greater than or equal to 0.004 and smaller than or equal to 0.048, and B5/A2 is greater than or equal to 0.001 and smaller than or equal to 0.045.

16. The display substrate according to claim 15, wherein a width-to-length ratio of the fifth transistor and a width-to-length ratio of the sixth transistor are C1, a width-to-length ratio of the sixteenth transistor is C2, both a width-to-length ratio of the fourteenth transistor and a width-to-length ratio of the fifteenth transistor are C3, and both a width-to-length ratio of the eighteenth transistor and a width-to-length ratio of the nineteenth transistor are C4;

C1/A1 is greater than or equal to 0.03 and smaller than or equal to 0.09, C2/A1 is greater than or equal to 0.08 and smaller than or equal to 0.6, C3/A1 is greater than or equal to 0.005 and smaller than or equal to 0.046, and C4/A1 is greater than or equal to 0.03 and smaller than or equal to 0.09; and C1/A2 is greater than or equal to 0.005 and smaller than or equal to 0.02, C2/A2 is greater than or equal to 0.01 and smaller than or equal to 0.06, C3/A2 is greater than or equal to 0.01 and smaller than or equal to 0.05, and C4/A2 is greater than or equal to 0.003 and smaller than or equal to 0.04.

17. A display device comprising the display substrate according to claim 1.

18. The display device according to claim 17, wherein the first length L1 is greater than the second length L2.

19. The display device according to claim 18, wherein the first length L1 is greater than or equal to 5.5 μm and smaller than or equal to 9 μm, the second length L2 is greater than or equal to 2 μm and smaller than or equal to 5.0 μm, and a ratio of the first length L1 to the second length L2 is greater than or equal to 1.1 and smaller than or equal to 4.5.

20. The display device according to claim 17, wherein the driving circuit further comprises a transistor for denoising a carry signal output end, and a transistor for denoising a driving signal output end;

a length of a channel of the transistor for denoising the carry signal output end is a third length L3;

a length of a channel of the transistor for denoising the driving signal output end is a fourth length L4; and the third length L3 is not equal to the second length L2, and the fourth length L4 is not equal to the second length L2.

* * * * *